(12) United States Patent
Sakai

(10) Patent No.: US 6,665,810 B1
(45) Date of Patent: Dec. 16, 2003

(54) INTERFACE CONTROLLER THAT CONTROLS THE RATE AT WHICH DATA IS TRANSFER BASED ON THE DESTINATION ADDRESS OF THE DATA

(75) Inventor: Yasushi Sakai, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/490,120

(22) Filed: Jan. 24, 2000

(30) Foreign Application Priority Data

Feb. 8, 1999 (JP) .......................................... 11-030075

(51) Int. Cl.⁷ ................................................. G06F 5/06
(52) U.S. Cl. ................ 713/600; 340/825.2; 340/825.21
(58) Field of Search ....................... 713/600; 340/825.2, 340/825.21

(56) References Cited

U.S. PATENT DOCUMENTS

| | | | |
|---|---|---|---|
| 5,099,140 A | * 3/1992 | Mudgett | 327/144 |
| 5,517,671 A | * 5/1996 | Parks et al. | 710/40 |
| 5,682,142 A | 10/1997 | Loosmore et al. | |
| 5,809,291 A | * 9/1998 | Munoz-Bustamante et al. | 713/501 |
| 5,848,251 A | * 12/1998 | Lomelino et al. | 710/305 |
| 5,982,210 A | * 11/1999 | Rogers | 327/117 |
| 6,000,022 A | * 12/1999 | Manning | 711/105 |
| 6,240,480 B1 | * 5/2001 | Wong et al. | 710/25 |
| 6,393,502 B1 | * 5/2002 | Meyer et al. | 365/221 |
| 6,405,270 B1 | * 6/2002 | Chen | 710/104 |

* cited by examiner

Primary Examiner—Thomas Lee
Assistant Examiner—Mark Connolly
(74) Attorney, Agent, or Firm—Arent Fox Kintner Plotkin & Kahn, PLLC

(57) ABSTRACT

An interface controller adaptively changes the data transfer rate of data being transferred between two or more devices depending on whether one of the devices is powered by an internal power supply and on the destination of the data. The controller includes a clock generator that generates a clock signal, a transfer unit that performs one of a first data transfer and a second data transfer at a transfer rate based on the clock signal, and a control circuit for adaptively changing the frequency of the clock signal depending on whether the first or second data transfer is to be performed.

23 Claims, 3 Drawing Sheets

INTERFACE CONTROLLER THAT CONTROLS THE RATE AT WHICH DATA IS TRANSFER BASED ON THE DESTINATION ADDRESS OF THE DATA

BACKGROUND OF THE INVENTION

The present invention relates to an interface controller, and more particularly, to an interface controller which conforms to the IEEE 1394 Standard.

FIG. 1 is a system block diagram in which a personal computer (PC) 30, a digital video camera (DVC) 31 and a video cassette recorder (VCR) 32 are connected by an IEEE 1394 bus 33. Each of the PC 30, DVC 31 and VCR 32 is provided with a repeat function which mediates a data transfer.

FIG. 2 is a schematic diagram of a conventional interface controller 35 of the DVC 31. The interface controller 35 includes input/output ports 36 and 37, interface circuits 38 and 39, a buffer 40 and a clock generator 41.

When the DVC 31 receives data addressed to it, the data is temporally stored in the buffer 40 from the input/output ports 36 and 37 via the interface circuits 38 and 39. The data is provided from the buffer 40 to an internal processing circuit (not shown) which performs image processing. When the DVC 31 outputs image data, the image data from the internal processing circuit is temporally stored in the buffer 40 and the image data is provided from the buffer 40 to the input/output ports 36, 37 via the interface circuits 38 and 39. In this manner, the data transfer between the PC 30 and the DVC 31 or between the DVC 31 and the VCR 32 is performed.

Further, when the DVC 31 receives data not addressed to it, that is, when data transfer is performed between the PC 30 and the VCR 32, the interface controller 35 of the DVC 31 mediates the data transfer. In other words, the interface controller 35 executes a repeat transfer.

Specifically, the data passed between the PC 30 and VCR 32 is temporally stored in the buffer 40 via the input/output ports 36 and 37 and the interface circuits 38 and 39. Then, the data transfer between the PC 30 and the VCR 32 is performed by clocking the interface circuits 38, 39 using a clock signal of the clock generator 41. In FIG. 2, the single-dot chain lines indicate the flow of data from the VCR 32 to the PC 30 and the two-dot chain lines indicate the flow of data from the PC 30 to the VCR 32.

The IEEE 1394 Standard defines transfer rates (or the communication performance) of 100 megabits per second, 200 megabits per second and 400 megabits per second. Accordingly, at the time of designing a device, an appropriate data rate is selected based on the data transfer requirement of the device and the power consumption requirement. In other words, a device, such as a portable device powered by a battery, is set to a low transfer rate to reduce the power consumption. For example, the DVC 31, since it is usually battery powered, is normally set to the transfer rate of 100 megabits per second. On the one hand, the PC 30 and the VCR 32, which are powered by an external household power supply, are set to the transfer rate of 400 megabits per second.

However, when the repeat transfer is conducted, the transfer rate is determined depending on the clock frequency of the clock generator of the mediating device. As shown in FIG. 3, when the DVC 31 having low-speed communication performance is connected between the PC 30 and the VCR 32 which have high-speed communication performance, the repeat transfer operation is performed at the low-speed transfer rate of 100 megabits per second. As a result, the performance of the PC 30 and/or VCR 32 is not used efficiently. Further, if the DVC 31, as a portable device, is designed for high speed, its power consumption increases. Accordingly, when the DVC 31 is powered by a battery, such high power consumption will cause problems.

If the PC 30 and the VCR 32 are connected in the relationship of "PC 30 to VCR 32 to DVC 31" as shown in FIG. 4, communication can be performed between the two devices 30 and 32 at 400 megabits per second. However, to connect the devices this manner, the communication speed of each device must be considered. In particular, if the device is used in a home, it is difficult to insure such connection.

SUMMARY OF THE INVENTION

It is an object of the present invention to provide an interface controller which provides the optimum communication performance.

In one aspect of the present invention, an interface controller connected to a plurality of devices is provided. The interface controller includes a clock generating unit for generating a clock signal having a frequency. A transfer unit performs one of a first data transfer and a second data transfer in accordance with the clock signal. The first data transfer is performed between a first other device and a second other device via the transfer unit and a second data transfer is performed between the transfer unit and one of the other devices. A clock control unit adaptively changes the frequency of the clock signal between the first and second data transfers.

In another aspect of the present invention, an interface controller for setting a data transfer rate of data transferred between at least two devices connected to a bus is provided. The interface controller includes an I/O port connected to the bus for sending and receiving data. An interface circuit passes data to and from the I/O port at a data transfer rate determined by a clock signal. A buffer circuit stores the data received from the I/O port and for storing internally generated data. A clock signal generator generates the clock signal. A control circuit generates a control signal used to change the frequency of the clock signal provided to the interface circuit.

In another aspect of the present invention, a method for transferring data between a self device and a plurality of other devices is provided. First, it is determined whether the data to be transferred is addressed to the self device or to one of the other devices. Then, a first data transfer is performed between a first other device and a second other device via the self device at a first transfer rate when the data is addressed to one of the other devices. A second data transfer is performed between the self device and one of the other devices at a second transfer rate that is slower than the first transfer rate when the data is addressed to the self device.

In yet another aspect of the present invention, a method for transferring data between a self device and a plurality of other devices is provided. The self device is powered by one of an internal power supply and an external power supply. First, it is determined whether the data to be transferred is addressed to the self device or to one of the other devices. Then, a first data transfer is performed between a first other device and a second other device via the self device at a first transfer rate when the data is addressed to one of the other devices and the self device is powered by the external power supply. A second data transfer is performed between the self device and one of the other devices at a second transfer rate that is slower than the first transfer rate when the data is addressed to the self device and the self device is powered by the internal power supply.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with accompanying drawings in which.

DETAILED DESCRIPTION OF THE PREFERRED EMBODIMENTS

Figure 1:
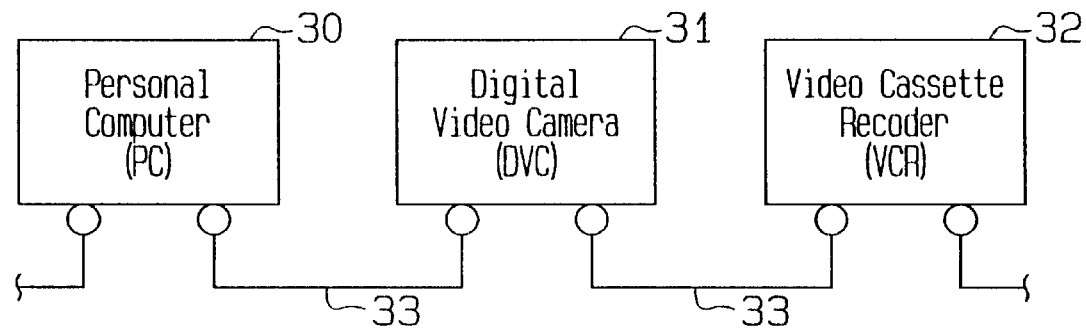
FIG. 1 is a system block diagram of devices connected by an IEEE 1394 bus.
Figure 2:
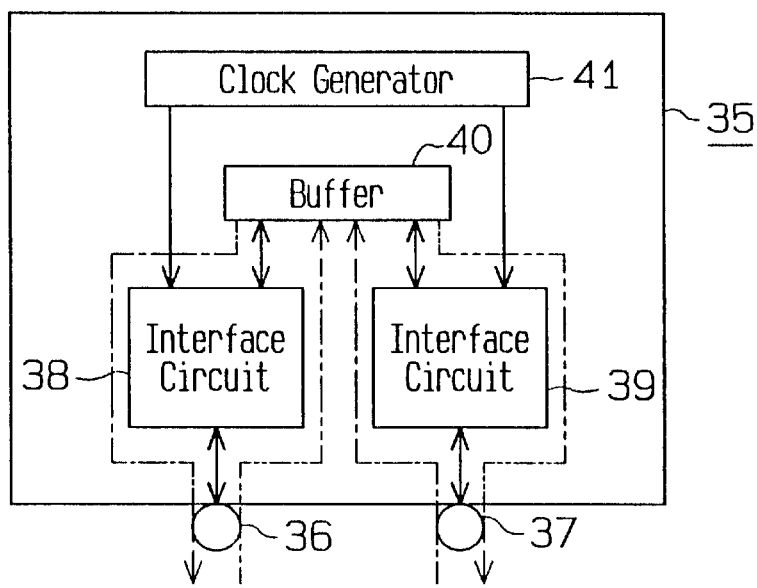
FIG. 2 is a schematic block diagram of a conventional interface controller of one of the devices of FIG. 1.
Figure 3:
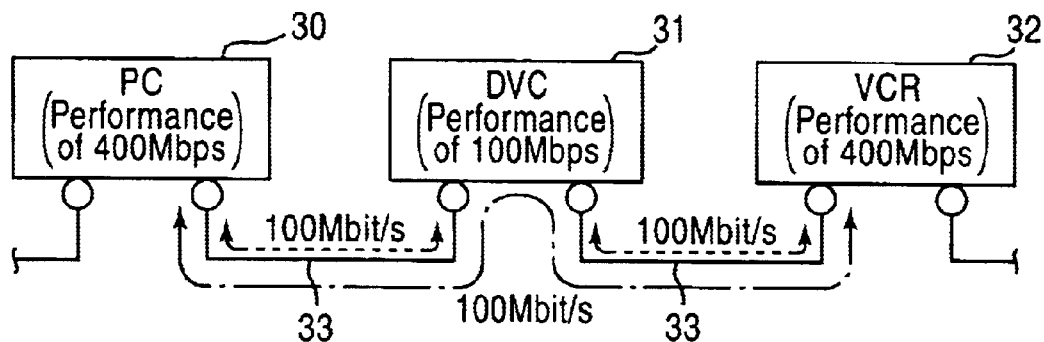
FIG. 3 is a schematic block diagram for describing a data transfer rate between the devices of FIG. 1.
Figure 4:
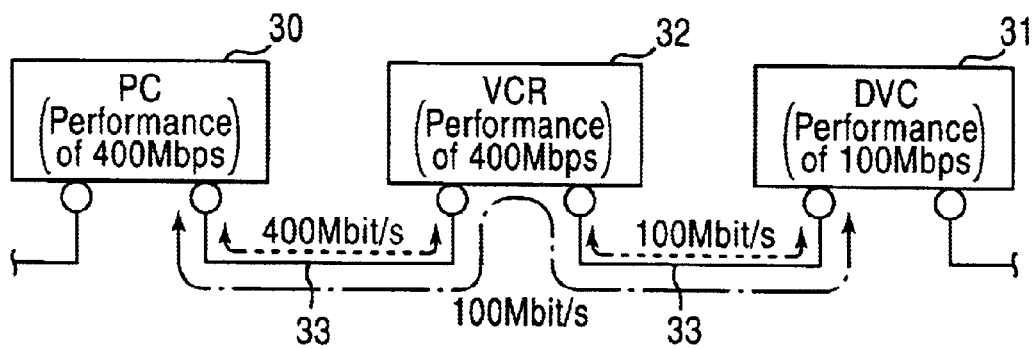
FIG. 4 is another schematic block diagram for describing a data transfer rate between devices of FIG. 1.
Figure 5:
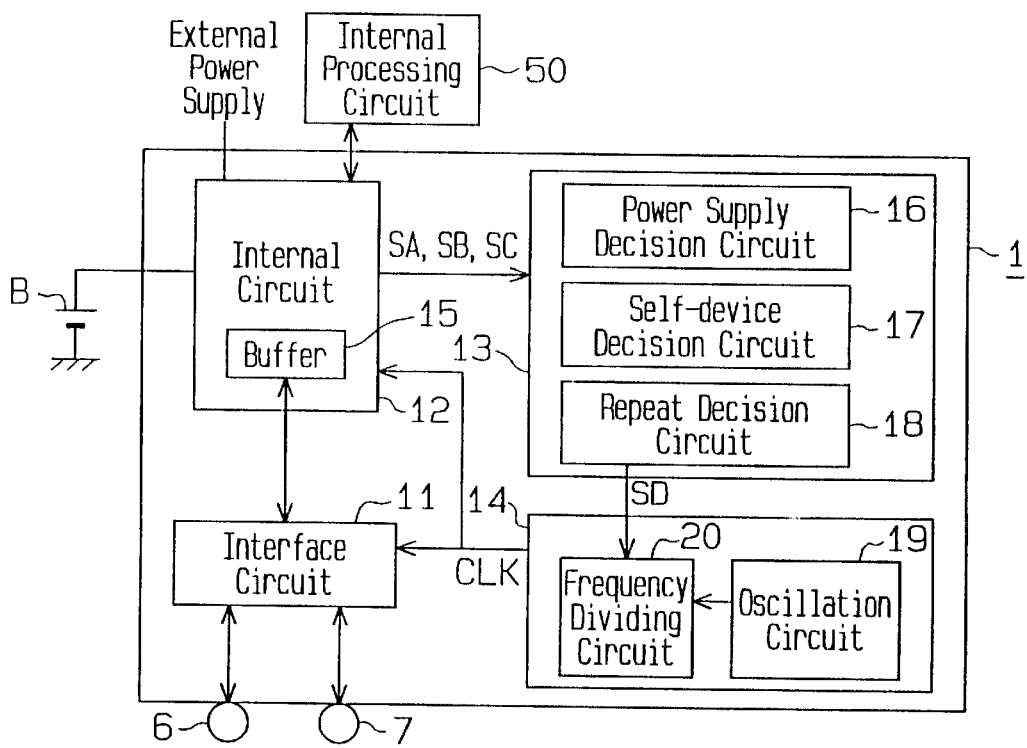
FIG. 5 is a schematic block diagram of an interface controller according to one embodiment of the present invention.

FIG. 5 is a schematic block diagram of an interface controller 1 according to one embodiment of the present invention. The interface controller 1 is part of a DVC 2 (see FIG. 6). The DVC 2 can perform a communication function with it is connected to a network.

Figure 6:
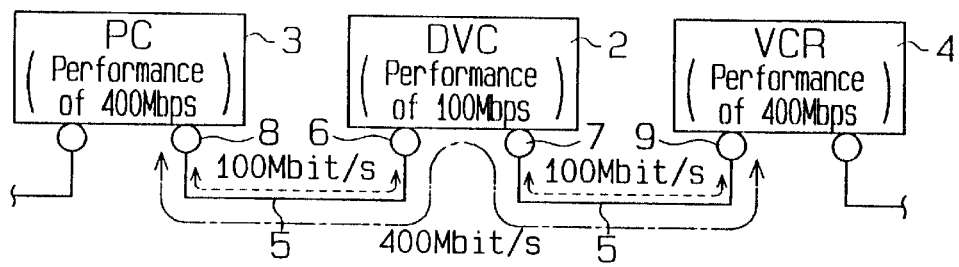
FIG. 6 is a schematic block diagram for describing a data transfer rate between devices using the interface controller of FIG. 5.

FIG. 6 is a system block diagram in which the DVC 2, a PC 3 and a VCR 4 are connected by IEEE 1394 buses 5. Input/output ports 6 and 7 of the DVC 2 are connected to an input/output port 8 of the PC 3 and an input/output port 9 of the VCR 4 by the IEEE 1394 buses 5, respectively.

As shown in FIG. 5, the interface controller 1 comprises the input/output ports 6 and 7, an interface circuit 11, an internal circuit 12, a clock control circuit 13 and a clock generator 14. The interface controller 1 is preferably formed in a single semiconductor integrated circuit device.

The input/output ports 6 and 7 are connected to the interface circuit 11 and the interface circuit 11 is connected to the internal circuit 12. Power is supplied to the internal circuit 12 from an external power supply, such as an AC adapter (not shown) or a built-in battery B of the DVC 2.

The internal circuit 12 includes a buffer 15. The transfer data input to the input/output ports 6 and 7 is stored in the buffer 15 by the interface circuit 11. The internal circuit 12 determines whether the transfer data is addressed to the DVC 2. If so, the transfer data is provided to an internal processing circuit 50 which executes image processing. On the contrary, if the data is not addressed to the DVC 2, the internal circuit 12 provides the transfer data stored in the buffer 15 to the interface circuit 11 to perform a repeat transfer operation. Further, the internal circuit 12 receives image data from the internal processing circuit 50 and stores the image data in the buffer 15, prior to outputting the stored data via the interface circuit 11.

The internal circuit 12 is connected to the clock control circuit 13 and provides a power supply decision signal SA to the clock control circuit 13. Further, the internal circuit 12 provides a self-device decision signal SB to the clock control circuit 13 when the image data is output. The internal circuit 12 provides a repeat decision signal SC to the clock control circuit 13 when the repeat transfer function is executed.

The clock control circuit 13 includes a power supply decision circuit 16, a self-device decision circuit 17 and a repeat decision circuit 18. The power supply decision circuit 16 determines whether the external power supply or the battery B power is supplying power to the internal circuit 12 based on the power supply decision signal SA. The self-device decision circuit 17 determines whether the image data transmission is to be performed based on the self-device decision signal SB. The repeat decision circuit 18 determines whether the repeat transfer function is to be performed based on the repeat decision signal SC. The clock control circuit 13 generates a control signal SD based on these decision results. The clock generator 14 receives the control signal SD from the clock control circuit 13 and uses it to determine the frequency of a clock signal CLK provided from the clock generator 14 to the interface circuit 13 and the internal circuit 12.

The clock generator 14 includes an oscillation circuit 19 and a frequency dividing circuit 20. The oscillation circuit 19 generates a basic signal having a predetermined frequency and the frequency dividing circuit 20 frequency-divides the basic signal to generate the clock signal CLK. The frequency dividing circuit 20 receives the control signal SD from the clock control circuit 13 and changes its frequency dividing ratio based on the control signal SD. In other words, the frequency of the clock signal CLK is changed based on the control signal SD. The internal circuit 12 and the interface circuit 11 transfer data stored in the buffer 15 in sync with the clock signal CLK.

If the repeat transfer function is executed when the DVC 2 is powered by the battery B, the frequency dividing circuit 20 sets a first frequency dividing ratio in response to the control signal SD. The first frequency dividing ratio corresponds to the transfer rate of 400 megabits per second. Accordingly, the DVC 2 executes the communication at the transfer rate of 400 megabits per second. When the DVC 2 is powered by the battery B and the data transfer for the self-device is performed, the frequency dividing circuit 20 sets a second frequency dividing ratio in response to the control circuit SD. The second frequency dividing ratio corresponds to the transfer rate of 100 megabits per second. Accordingly, the DVC 2 executes the communication at the transfer rate of 100 megabits per second.

On the contrary, when the DVC 2 is powered by an external power supply, the frequency dividing circuit 20 sets the first frequency dividing ratio in response to the control signal SD. Accordingly, the DVC 2 executes the repeat transfer and the image data transfer at the transfer rate of 400 megabits per second.

Figure 7:
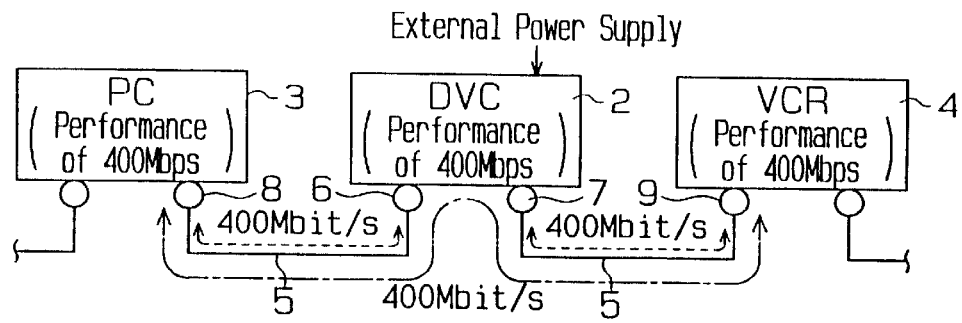
FIG. 7 is another schematic block diagram for describing a data transfer rate between devices using the interface controller of FIG. 5.

For example, when the DVC 2 is connected to an IEEE 1394 bus, negotiations are carried out between the DVC 2, PC 3 and VCR 4 for bus reset. Specifically, the internal circuit 12 of the DVC 2 receives the transfer data including information which reports communication performance of the PC 3 and the VCR 4 via the input/output ports 6 and 7 and the interface circuit 11. The internal circuit 12 determines the communication performance of the PC 3 and the VCR 4 based on the transfer data. In other words, as shown in FIG. 7, the internal circuit 12 determines that the communication performance of the PC 3 and the VCR 4 are 400 megabits per second. The internal circuit 12 produces the transfer data including the information indicating that self communication performance is 400 megabits per second and outputs the transfer data via the interface circuit 11 and the input/output ports 6 and 7.

The internal circuit 12 simultaneously provides an initial setting signal to the clock control circuit 13. The clock control circuit 13 provides a control signal in response to the initial setting signal so that the frequency dividing circuit 20 is set at the first frequency dividing ratio and generates the clock signal CLK having the frequency of 400 megabits per second. Thus, the DVC 2 determines self communication performance in accordance with the communication performance of the PC 3 and the VCR 4.

In this embodiment, the interface circuit 11 and the internal circuit 12 correspond to a repeat transfer unit and the internal circuit 12 corresponds to a reporting unit.

Next, the operation of the interface controller 1 will be described when the DVC 2 is powered by the built-in battery B, and photograph image data is to be transferred from the DVC 2 to the PC 3.

When the DVC 2 is connected to a network, the communication performance of the DVC 2 is set to the transfer rate of 400 megabits per second by a bus reset. Subsequently, the PC 3 provides the transfer data having a send request command for image data to the DVC 2. The DVC 2 receives the transfer data via the input/output port 6 and the interface circuit 11 and the transfer data is stored in the buffer 15. The internal circuit 12 determines, based on the sending request command, that the received transfer data stored in the buffer 15 is addressed to the DVC 2 and provides an instruction signal for executing image processing to the internal processing circuit 50. Then, the internal circuit 12 provides the image data to the internal processing circuit 50, where it is processed. The processed data is then stored into the buffer 15.

The internal circuit 12 sends transfer data via the interface circuit 11 and the input/output port 6 to the PC 3 indicating that the communication will be carried out at the transfer rate of 100 megabits per second.

Then, the internal circuit 12 provides the decision signals SA, SB and SC to the clock control circuit 13. The power supply decision circuit 16 determines that the DVC 2 is powered by the battery B and the self-device decision circuit 17 determines that the image data transfer will be performed by the self-device (DVC 2). Based on the resulting control signals SA, SB and SC, the frequency dividing circuit 20 set the clock signal CLK using the second frequency dividing ratio.

The image data stored in the buffer 15 is output from the input/output port 6 via the interface circuit 11 in synchronism with the clock signal CLK. That is, the image data is sent from the DVC 2 to the PC 3 at the transfer rate of 100 megabits per second. The PC 3 receives the image data and displays an image on a display (not shown).

Next, the case where the DVC 2 executes the repeat transfer from the state in which the communication performance of the DVC 2 is set at 100 megabits per second is described.

First, when the PC 3 provides recording data to the VCR 4, the recording data is temporally stored in the buffer 15 of the internal circuit 12 of the DVC 2. The internal circuit 12 determines based on the input data stored in the buffer 15 that the data is not addressed to the DVC 2 and provides the repeat decision signal SC to the clock control circuit 13. At this time, the internal circuit 12 reports the change of the communication performance from a self-device to the PC 3 and the VCR 4. That is, the internal circuit 12 outputs the transfer data indicating that the transfer rate is 400 megabits per second.

Then, the clock control circuit 13 provides the control signal SD to the frequency dividing circuit 20 based on the decision result of the repeat decision circuit 18. The frequency dividing circuit 20 changes the frequency of the clock signal CLK to a frequency which corresponds to the transfer rate of 400 megabits per second. The data stored in the buffer 15 is output from the input/output port 7 via the interface circuit 11 in accordance with the clock signal CLK. That is, the recording data is provided to the VCR 4 at the transfer rate of 400 megabits per second. The VCR 4 receives the recording data from the DVC 2 and processes the recording data. The data to be transferred from the PC 3 to the VCR 4 is temporarily received by the DVC 2 at the transfer rate of 400 megabits per second and is provided to the VCR 4 by the repeat transfer processing at 400 megabits per second. Further, the data to be transferred from the VCR 4 to the PC 3 is temporarily received and output by the DVC 2 at the transfer rate of 400 megabits per second.

When image data is transferred from the DVC 2 to the VCR 4 and the communication performance of the DVC 2 is set at the transfer rate of 400 megabits per second, the internal circuit 12 provides the self-device decision signal SB to the clock control circuit 13. At this time, the internal circuit 12 provides the transfer data indicating that its communication is to be executed at the transfer rate of 100 megabits per second to the VCR 4.

Then, the clock control circuit 13 controls the clock generator 14 to change the frequency of the clock signal CLK. The image data stored in the buffer 15 is provided via the interface circuit 11 and the input/output port 7 to the VCR 4 at the transfer rate of 100 megabits per second. The VCR 4 receives transferred data at the transfer rate of 100 megabits per second and stores the received transfer data.

Thus, when the DVC 2 is powered by the built-in battery B, as shown in FIG. 6, data transfer is performed between the PC 3 and the DVC 2 or between the DVC 2 and the VCR 4 at the transfer rate of 100 megabits per second. Further, the data transfer is performed between the PC 3 and VCR 4 at the communication speed of 400 megabits per second by the repeat transfer of the DVC 2.

Next, the case where the DVC 2 is powered by an external power supply is described.

First, when the DVC 2 is connected to an external power supply, the internal circuit 12 determines that the DVC 2 receives power from the external power supply and provides the power supply decision signal SA to the clock control circuit 13. At this time, the internal circuit 12 provides the transfer data indicating that its communication is to be executed at the transfer rate of 400 megabits per second to the PC 3 and the VCR 4.

The clock control circuit 13 determines that the DVC 2 is powered by an external power supply based on the power supply decision signal SA and controls the frequency dividing circuit 20 to change the frequency dividing ratio corresponding to the transfer rate of 400 megabits per second. Hence, the frequency of the clock signal CLK is changed and data is transferred at the transfer rate of 400 megabits per second by the internal circuit 12 and the interface circuit 11. That is, as shown in FIG. 7, when the DVC 2 is powered by an external power supply, all communications between the PC 3, the VCR 4, and the DVC 2 are executed at 400 megabits per second.

For example, if the communication performance of the PC 3 is 400 megabits per second and the communication performance of the VCR 4 is 200 megabits per second, negotiations are performed between the DVC 2 and VCR 4 and the DVC 2 sets its communication performance at the repeat transfer to the transfer rate of 200 megabits per second. In this case, the PC 4 also sets its communication performance to the transfer rate of 200 megabits per second to match the communication performance of the VCR 4.

It is evident that the present invention may be adapted to a network in which different types of devices and a different number of devices are connected.

As described above, the interface controller 1 has the following features.

(1) The DVC 2 connected to a network sets the optimum communication performance in accordance with communication conditions automatically. Therefore, in particular, if the interface controller 1 is applied to home electronics devices, the user does not have to be concerned with how the devices are connected.

(2) When data transfer is performed between the PC 3 and the VCR 4, the communication performance of the DVC 2 is set to 400 megabits per second in accordance with the communication performance of the PC 3 and the VCR 4. Accordingly, transfer processing is executed at the optimum transfer rate between the PC 3 and the VCR 4. If the DVC 2 is powered by the battery B, communication between the DVC 2 and the PC 3 or between the DVC 2 and the VCR 4 is executed at 100 megabits per second. Consequently, the power consumption of the DVC 2 is reduced.

It should be apparent to those skilled in the art that the present invention may be embodied in many other specific forms without departing from the spirit or scope of the invention. Particularly, it should be understood that the invention may be embodied in the following forms.

(a) When performing a receiving function, the DVC 2 may set its communication performance to 100 megabits per second, such as when receiving image data. This reduces the power consumption of the DVC 2. The interface controller 1 may be applied to other devices, such as a personal computer.

(b) The clock generator 14 may include an oscillator which can change the frequency. In this case, the oscillator changes the frequency of the clock signal CLK in accordance with a control signal from the clock control circuit 13.

(c) The clock control circuit 13 may determines whether the DVC 2 is powered by the external power supply based on a signal from a power supply detection circuit. Alternatively, the power supply decision circuit 16 may directly determine the type of power supply based on the power supplied thereto.

(d) When the DVC 2 is powered by the external power supply, the DVC 2 may perform data transfer at the transfer rate of 100 megabits per second and perform the repeat transfer at the transfer rate of 400 megabits per second.

Further, when the DVC 2 is powered by a battery, the transfer rate may be set to 100 megabits per second regardless of whether the repeat transfer is performed or not and when the DVC 2 is powered by an external power supply, data transfer is performed between the DVC 2 and the PC 3 or the VCR 4 at 100 megabits per second and the repeat transfer is performed at 400 megabits per second.

Furthermore, when the DVC 2 is powered by the battery, the transfer rate may be set to 100 megabits per second regardless of whether the repeat transfer is performed and when the DVC 2 is powered by the external power supply, the transfer rate may be set to 400 megabits per second.

When the DVC 2 is powered by the external power supply, the transfer rate may be set to 100 megabits per second if the data transfer is performed between the DVC 2, the PC 3 and the VCR 4, and to 400 megabits per second if repeat transfer is performed.

(e) In the bus reset, if the DVC 2 is powered by a battery, the DVC 2 may report that data transfer at the transfer rate of 100 megabits per second can be performed. By doing so, power consumption is reduced.

Therefore, the present examples and embodiments are to be considered as illustrative and not restrictive and the invention is not to be restricted to the details given herein, but may be modified within the scope and equivalence of the appended claims.

What is claimed is:

1. An interface controller performing a first data transfer with a first device, comprising:
   a first port for connecting to a second device to perform a second data transfer;
   a second port for connecting to a third device to perform a the second data transfer;
   a clock generating circuit for generating a clock signal having a frequency;
   a transfer unit, connected to the clock generating circuit, for performing one of the first data transfer and the second data transfer; and
   a clock control unit, connected to the clock generating circuit, for performing the second data transfer when data is addressed to one of the second device and the third device.

2. The interface controller of claim 1, wherein the transfer unit determines whether data is addressed to the first device or to one of the second and third devices and the clock control unit determines one of the first and second data transfers to be performed based on the determination result.

3. The interface controller of claim 2, wherein the second transfer is faster than the first data transfer.

4. The interface controller of claim 3, wherein the clock control unit changes the frequency of the clock signal to a first frequency corresponding to the first data transfer when the first data transfer is performed and changes the frequency of the clock signal to a second frequency corresponding to the second data transfer when the second data transfer is performed.

5. The interface controller of claim 1, wherein the clock control unit changes the frequency of the clock signal to a first frequency corresponding to a first transfer rate when the first data transfer is performed and changes the frequency of the clock signal to a second frequency corresponding to a second transfer rate that is faster than the first transfer rate when the second data transfer is performed.

6. The interface controller of claim 1, wherein the interface controller is powered by one of an internal power supply and an external power supply, wherein when the interface controller is powered by the external power supply, the clock control unit changes the frequency of the clock signal to a first frequency corresponding to a first transfer rate for the first data transfer and changes the frequency of the clock signal to a second frequency corresponding to a second transfer rate that is faster than t he first transfer rate for the second data transfer, and wherein when the interface controller is powered by the internal power supply, the clock control unit maintains the frequency of the clock signal to the first frequency.

7. The interface controller of claim 1, wherein the interface controller is powered by one of an internal power supply and an external power supply, wherein when the interface controller is powered by the internal power supply, the clock control unit changes the frequency of the clock signal to a first frequency corresponding to a first transfer rate for the first data transfer and changes the frequency of the clock signal to a second frequency corresponding to a second transfer rate that is faster than the first transfer rate for the second data transfer, and wherein when the interface controller is powered by the external power supply, the clock control unit maintains the frequency of the clock signal to the second frequency.

8. The interface controller of claim 1, wherein the clock generating unit includes:
   an oscillation circuit for generating a basic signal; and
   a frequency dividing circuit, connected to the oscillation circuit, for generating the clock signal by frequency-dividing the basic signal in accordance with a predetermined frequency-dividing ratio, wherein the clock control unit changes the frequency dividing ratio between the first and second data transfers.

9. The interface controller of claim 1, wherein at the second data transfer, data is input to the first port and output from the second port.

10. The interface controller of claim 1, wherein the transfer unit reports a second transfer rate, which corresponds to the communication performance of the second device or the third device, to the second device or the third device before starting the second data transfer and reports a first transfer rate that is slower than the second transfer rate when the first data transfer is performed between the first device and one of the second and third devices.

11. The interface controller of claim 10, wherein the clock control unit sets the frequency of the clock signal to a frequency corresponding to the first transfer rate until the data for performing the second data transfer is provided to the transfer unit.

12. The interface controller of claim 1, wherein the first device is powered by an internal power supply.

13. The interface controller of claim 1, wherein the second device and the third device are powered by an external power supply.

14. An interface controller for transferring data between at least two devices connected to a bus, the controller comprising:
   an I/O port connected to the bus for sending and receiving data;
   an interface circuit, connected to the I/O port, for passing data to and from the I/O port at one of the first data transfer rate, which is determined by a first clock signal, and a second data transfer rate, which is determined by a second clock signal;
   an internal port, connected to the interface circuit, being set to transfer data at the first data transfer rate;
   a clock signal generator, connected to the interface circuit, for generating the first clock signal and the second clock signal; and
   a control circuit, connected to the clock signal generator, for generating a first control signal used to generate the first clock signal when data is addressed to the interface controller and generating a second control signal used to generate the second clock signal when data is addressed to one of the at least two devices.

15. The interface controller of claim 14, wherein the I/O port includes a first I/O port connectable to a first device and a second I/O port connectable to a second device.

16. The interface controller of claim 15, wherein the clock signal generator comprises:
   an oscillator for generating an oscillation signal; and
   a frequency dividing circuit, connected to the oscillator, for receiving the oscillation signal, the frequency dividing circuit generating the first and second clock signals using the oscillation signal, wherein the frequency dividing circuit generates one of the first and second clock signals using a frequency dividing ratio specified by the corresponding one of the first and second control signals.

17. The interface controller of claim 16, wherein the control circuit includes a power supply decision circuit for selecting a first frequency dividing ratio specified by the first control signal when power is supplied to the controller from an external power source and a second frequency dividing ratio specified by the second control signal when the power is supplied to the controller from an internal power source.

18. The interface controller of claim 17, wherein the control circuit includes a self device decision circuit for setting one of the first and second control signals based on a destination of the received data.

19. The interface controller of claim 14, wherein the bus comprises an IEEE 1395 type bus.

20. The interface controller of claim 14, further comprising a buffer circuit, connected to the interface circuit, for storing the data received from the I/O port and for storing internally generated data.

21. A method for transferring data between a self device performing a first data transfer and a plurality of other devices performing a second data transfer, comprising the steps of:
   determining whether the data to be transferred is addressed to the self device or to one of the other devices;
   performing the first data transfer between the self device and one of the other devices at a first transfer rate when the data is addressed to the self device; and
   performing the second data transfer between a first other device and a second other device via the self device at a second transfer rate that is faster than the first transfer rate when the data is addressed to one of the other devices.

22. A method for transferring data between a self device and a plurality of other devices, wherein the self device is powered by an internal power supply, the method comprising the steps of:
   determining whether the data to be transferred is addressed to the self device or to one of the other devices;
   performing a first data transfer between the self device and one of the other devices at a first transfer rate when the data is addressed to the self device; and
   performing a second data transfer between a first other device and a second other device via the self device at a second transfer rate that is faster than the first transfer rate when the data is addressed to one of the other devices.

23. A method for transferring data between a self device and at least two other devices, wherein the self device is powered by an internal power supply and the at least two devices are powered by an external power supply, the method comprising the steps of:

determining whether the data to be transferred is addressed to the self device or to one of the at least two devices;

performing the first data transfer between the self device and one of the at least two other devices at a first transfer rate when the data is addressed to the self device; and performing a second data transfer between a first other device and a second other device via the self device at a second transfer rate when the data is addressed to one of the at least two other devices.

* * * * *

UNITED STATES PATENT AND TRADEMARK OFFICE
CERTIFICATE OF CORRECTION

PATENT NO. : 6,665,810 B1            Page 1 of 1
DATED : December 15, 2003
INVENTOR(S) : Yasushi Sakai It is certified that error appears in the above-identified patent and that said Letters Patent is hereby corrected as shown below:

<u>Title page, Item [54] and Column 1, lines 1-4,</u>
Please change the title to read as follows:
-- INTERFACE CONTROLLER THAT CONTROLS THE RATE AT WHICH DATA IS TRANSFERRED BASED ON THE DESTINATION ADDRESS OF THE DATA --.

Signed and Sealed this

Sixth Day of July, 2004

JON W. DUDAS
*Acting Director of the United States Patent and Trademark Office*